(12) United States Patent
Kim et al.

(10) Patent No.: US 9,882,441 B2
(45) Date of Patent: Jan. 30, 2018

(54) MOTOR

(71) Applicant: SAMSUNG ELECTRONICS CO., LTD., Suwon-si, Gyeonggi-do (KR)

(72) Inventors: Sung Il Kim, Yongin-si (KR); Seong Taek Lim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 623 days.

(21) Appl. No.: 14/516,843

(22) Filed: Oct. 17, 2014

(65) Prior Publication Data
US 2015/0171683 A1 Jun. 18, 2015

(30) Foreign Application Priority Data
Dec. 12, 2013 (KR) .................. 10-2013-0154505

(51) Int. Cl.
H02K 21/12 (2006.01)
H02K 1/27 (2006.01)
H02K 1/14 (2006.01)
H02K 21/16 (2006.01)

(52) U.S. Cl.
CPC .......... *H02K 1/2773* (2013.01); *H02K 1/146* (2013.01); *H02K 21/16* (2013.01)

(58) Field of Classification Search
CPC ....... H02K 19/103; H02K 1/146; H02K 1/276
USPC .......... 310/156.53–156.57, 216.001–216.137
See application file for complete search history.

(56) References Cited

U.S. PATENT DOCUMENTS

| | | | |
|---|---|---|---|
| 2009/0224624 A1* | 9/2009 | Kumar | H02K 1/276 310/156.53 |
| 2012/0104895 A1* | 5/2012 | Ramu | H02K 1/24 310/216.106 |
| 2012/0194026 A1* | 8/2012 | Matsuoka | H02K 1/2766 310/156.53 |

* cited by examiner

Primary Examiner — Thanh Lam
(74) Attorney, Agent, or Firm — Staas & Halsey LLP

(57) ABSTRACT

A motor including a stator, and a rotor adapted to rotate, wherein the stator includes a stator body, a plurality of teeth protruding from the stator body toward the rotor, and at least one stator magnetic barrier provided to each of the teeth to interrupt magnetic flux. A magnetic field produced in a direction parallel to the outer circumferential surface of the rotor is attenuated, and therefore demagnetization of permanent magnets included in the rotor may be prevented.

16 Claims, 11 Drawing Sheets

MOTOR

CROSS-REFERENCE TO RELATED APPLICATION

This application claims the benefit of Korean Patent Application No. 10-2013-0154505, filed on Dec. 12, 2013 in the Korean Intellectual Property Office, the disclosure of which is incorporated herein by reference.

BACKGROUND

1. Field

Embodiments of the present disclosure relate to an interior permanent magnet (IPM) motor having a permanent magnet provided in the rotor.

2. Description of the Related Art

Motors are widely used in home appliances including a laundry machine, a refrigerator, an air conditioner, and a cleaner. They are used even in electric vehicles and hybrid vehicles, which have recently attracted attention.

Among the motors, a permanent magnet motor employing a permanent magnet rotates a rotor using magnetic interaction between a magnetic field produced by a coil through which electrical current flows and a magnetic field produced by the permanent magnet.

The permanent magnet may be demagnetized by the magnetic field produced by the coil. In other words, the magnetic field produced by the coil may magnetize the permanent magnet in the opposite direction, or may weaken the magnetic field strength of the permanent magnet.

Such demagnetization effect is permanent and is not eliminated unless the permanent magnet is magnetized in the original direction.

In addition, when demagnetization of the permanent magnet occurs, the strength of the magnetic field produced by the permanent magnet is weakened. Thereby, the output torque of the motor may be reduced.

SUMMARY

Therefore, it is an aspect of the present disclosure to provide a motor including an armature to attenuate a component of a magnetic field which leads to demagnetization.

Additional aspects of the disclosure will be set forth in part in the description which follows and, in part, will be apparent from the description, or may be learned by practice of the disclosure.

In accordance with one aspect of the present disclosure, a motor includes a stator, and a rotor adapted to rotate, wherein the stator includes a stator body, a plurality of teeth protruding from the stator body toward the rotor, and at least one stator magnetic barrier provided to each of the teeth to interrupt magnetic flux.

At least one stator magnetic barrier may be provided to a portion of each of the teeth close to the rotor.

The at least one stator magnetic barrier may be provided to one side of the teeth.

The at least one stator magnetic barrier may include a first stator magnetic barrier provided to one side of the teeth in a clockwise direction and a second stator magnetic barrier provided to the other side of the teeth in a counterclockwise direction.

The plurality of teeth may include a first tooth provided with the first stator magnetic barrier and a second tooth provided with the second stator magnetic barrier.

The first tooth and the second tooth may be alternately disposed along an inner circumferential surface of the stator.

Each of the plurality of teeth may be provided with the first stator magnetic barrier and the second stator magnetic barrier.

The at least one stator magnetic barrier may attenuate a strength of a magnetic field produced in a circumferential direction by the stator.

The at least one the stator magnetic barrier may be constructed by a non-magnetic material or air.

The rotor may include a plurality of pole modules to produce a magnetic field and a magnetic member to concentrate the magnetic field.

The plurality of pole modules may be embedded in the magnetic member.

The plurality of pole modules may include a pair of permanent magnets magnetized in a circumferential direction of the rotor and a rotor magnetic barrier provided at an inner side of the pair of permanent magnets to connect the permanent magnets to each other.

The permanent magnets may be magnetized in different directions.

The rotor may include a plurality of permanent magnets to produce a magnetic field and a magnetic member to concentrate the magnetic field.

The plurality of permanent magnets may be magnetized in a circumferential direction of the rotor.

The plurality of permanent magnets may include a first permanent magnet magnetized in a clockwise direction of the rotor and a second permanent magnet magnetized in a counterclockwise direction of the rotor.

The first permanent magnet and the second permanent magnet may be alternately disposed along a circumference of the rotor.

The rotor may include a plurality of permanent magnet groups to produce a magnetic field and a magnetic member to concentrate the magnetic field.

The plurality of permanent magnet groups may include a first permanent magnet group provided with a permanent magnet magnetized in a radially outward direction of the rotor and a second permanent magnet group provided with a permanent magnet magnetized in a radially inward direction of the rotor.

The first permanent magnet group and the second permanent magnet group may be alternately disposed along a circumference of the rotor.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
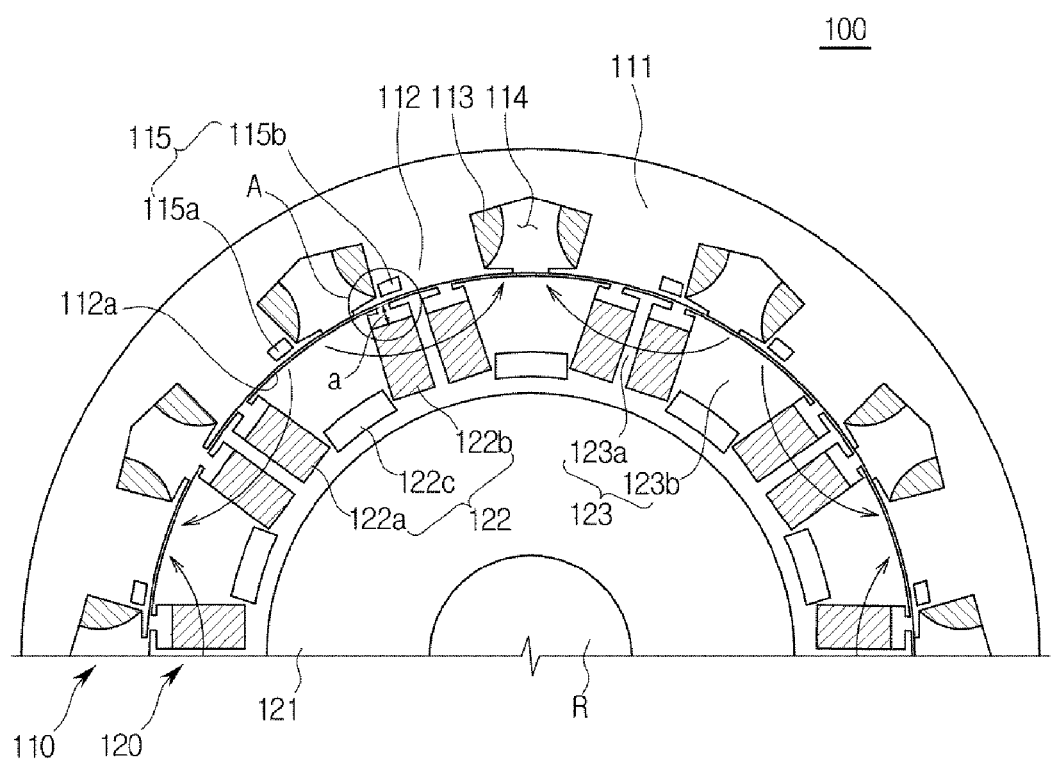
FIG. 1 is a cross-sectional view illustrating a motor according to an exemplary embodiment of the present disclosure.

Reference will now be made in detail to the embodiments of the present disclosure, examples of which are illustrated in the accompanying drawings, wherein like reference numerals refer to like elements throughout.

It should be understood that embodiments disclosed in this specification and constituents shown in the accompanying drawings are simply illustrative and there may be many variations which may replace the embodiments and drawings of this specification at the time of filing of this application.

Reference will now be made in detail to the embodiments of the present disclosure, examples of which are illustrated in the accompanying drawings, wherein like reference numerals refer to like elements throughout.

FIG. 1 is a cross-sectional view illustrating a motor according to an exemplary embodiment of the present disclosure.

As shown in FIG. 1, a motor 100 according to one embodiment includes a stator 110 fixed by an external support structure (not shown), a rotor 120 adapted to rotate through magnetic interaction with the stator 110, and a shaft R to transmit the rotational power of the rotor 120 to an external load.

The shaft R is rotatably supported by the external support structure (not shown) and coupled to the rotor 120 to rotate together with the rotor 120, which will be described later.

The rotor 120 includes a rotor core 121, a pole module 122, and a magnetic member 123.

The rotor core 121 is formed of a non-magnetic material and connected to the shaft R to transmit rotational power to the shaft R.

The pole module 122 includes a first permanent magnet 122a and second permanent magnet 122b to produce magnetic fields, and a rotor magnetic barrier 122c to interrupt magnetic flux produced by the first and second permanent magnets 122a and 122b.

As shown in FIG. 1, the first and second permanent magnets 122a and 122b are disposed toward the rotor core 121 in a radially inward direction.

Herein, the first and second permanent magnets 122a and 122b extend up to a position spaced width a from the outer circumferential surface of the rotor 120, rather than extending up to the outer circumferential surface of the rotor 120. In other words, the space between the distal ends of the first and second permanent magnets 122a and 122b and the outer circumferential surface of the rotor 120 is filled with a non-magnetic material or air.

In addition, the directions of magnetization by the first and second permanent magnets 122a and 122b may point to the opposite sides in the circumferential direction of the rotor 120. In other words, the first and second permanent magnets 122a and 122b are disposed such that the same poles face each other.

For example, the first and second permanent magnets 122a and 122b may be disposed with the north (N) poles each other or the south (S) poles thereof each other. In other words, magnetization may occur such that magnetic lines of force extend from the outer side of the first and second permanent magnets 122a and 122b through the first and second permanent magnets 122a and 122b and head for a portion between the first permanent magnet 122a and the second permanent magnet 122b, or such that magnetic lines of force extend from a portion between the first permanent magnet 122a and the second permanent magnet 122b through the first and second permanent magnets 122a and 122b and head for the outer sides of the first permanent magnet 122a and the second permanent magnet 122b.

The rotor magnetic barrier 122c connects ends of the first and second permanent magnets 122a and 122b to each other. For example, the rotor magnetic barrier 122c may connect one of the two ends of the first and permanent magnet 122a positioned closer to the rotor core 121 to one of the two ends of the second permanent magnet 122b positioned closer to the rotor core 121.

In addition, the rotor magnetic barrier 122c may be disposed spaced apart from the rotor core 121. For example, the rotor magnetic barrier 122c may be disposed spaced a distance greater than or equal to a predetermined distance from the outer circumferential surface of the rotor core 121.

The rotor magnetic barrier 122c may be filled with a non-magnetic material or air.

Figure 2:
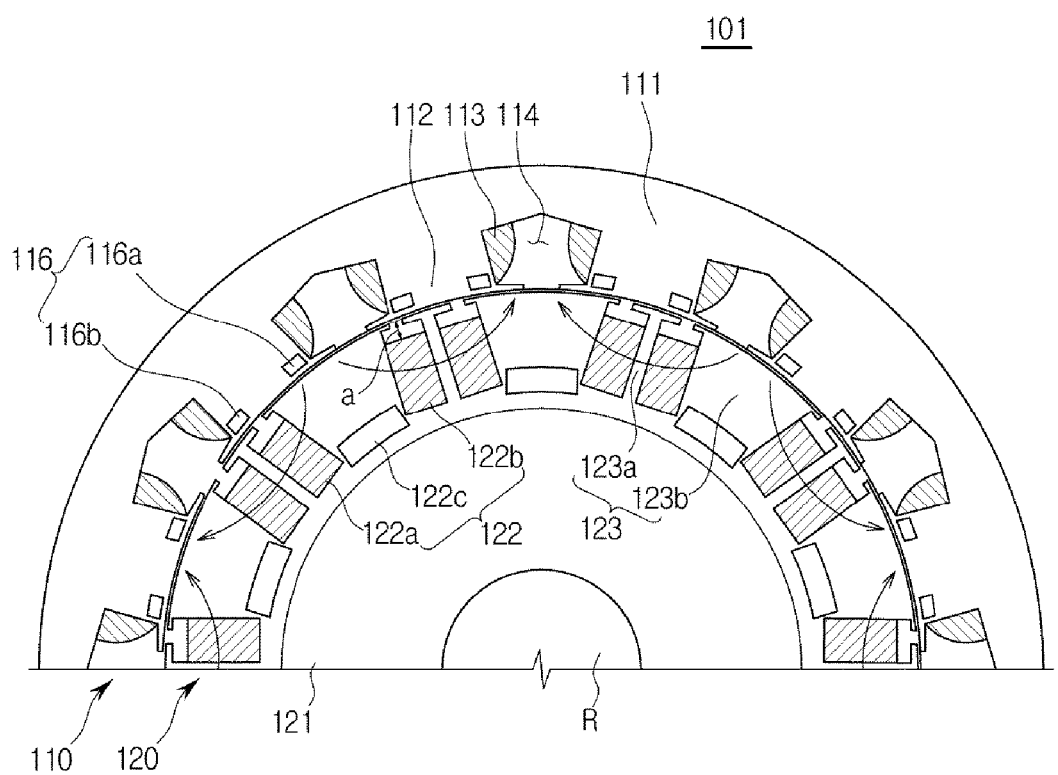
FIG. 2 is a cross-sectional view illustrating a motor according to another embodiment of the present disclosure.

As shown in FIGS. 1 and 2, the first permanent magnet 122a, the second permanent magnet 122b and the rotor magnetic barrier 122c included in the pole module 122 are disposed to form a U shape open radially outward of the rotor 120. Specifically, the first permanent magnet 122a and second permanent magnet 122b are disposed such that magnetization occurs in the opposite directions, and the rotor magnetic barrier 122c is disposed at one end of the portion between the first permanent magnet 122a and second permanent magnet 122b.

Due to the rotor magnetic barrier, the magnetic fields produced by the first permanent magnet 122a and second permanent magnet 122b are concentrated in the radially outward direction or radially inward direction of the rotor 120, as shown in FIG. 1.

A plurality of pole modules 122 may be provided. In addition, one of two adjoining pole modules may create N pole on the outer circumferential surface of the rotor 120, and the other one may create S pole on the outer circumferential surface of the rotor 120.

In other words, pole modules creating N pole and pole modules creating S pole are alternately disposed along the circumference of the rotor 120. As a result, N pole and S pole are alternately arranged along the outer circumferential surface of the rotor 120.

In addition, the pole modules 122 may be disposed spaced a certain distance from each other along the outer circumferential surface of the rotor 120.

The magnetic member 123 radially protrudes from the rotor core 121 toward the stator 110. The magnetic member 123 includes a first magnetic member 123a having a small width and disposed between neighboring pole modules 122 and a second magnetic member 123b having a wide width and disposed between the first permanent magnet 122a and second permanent magnet 122b.

As the first and second permanent magnets 122a and 122b are disposed between the first magnetic member 123a and the second magnetic member 123b, the first and second permanent magnets 122a and 122b are fixed by the magnetic member 123, and the second magnetic member 123b is provided with a hole to create the rotor magnetic barrier 122c.

The magnetic member 123 may be formed of a magnetic material magnetized by the magnetic field. As shown in FIGS. 1 and 2, the magnetic member 123 may be fabricated by stacking metal plates having the shape of the first magnetic member 123a and the second magnetic member 123b in the direction of the shaft R.

The motor 100 shown in FIGS. 1 and 2 is a spoke type motor including permanent magnets with each pole coming in pairs. However, embodiments of the present disclosure are not limited thereto.

As shown in FIG. 1, the stator 110 is formed in the shape of a cylinder having a hollow, and the rotor 120 is inserted into the hollow of the stator 110.

The stator 110 includes a stator body 111, teeth 112 and a coil 113. A slot 114 is formed between neighboring teeth 112.

The stator body 111 may have a cylindrical shape and be fixed to an external support structure (not shown).

The teeth 112 radially protrude from the inner circumferential surface of the stator body 111 toward the rotor 120.

The teeth 112 may be integrated with the stator body 111. By stacking metal plates having the shape of the stator body 111 and the teeth 112 in the direction of the shaft R, the stator body 111 and the teeth 112 may be fabricated.

In addition, an end of each of the teeth 112 is provided with a tooth wide width portion protruding to both sides of each of the teeth. As the tooth wide width portions are formed at the ends of the teeth 112, the area of the stator 110 facing the rotor 110 may increase.

In addition, a stator magnetic barrier 115 to interrupt magnetic flux produced by the coil 113, which will be described later, is provided near end surfaces 112a of the teeth 112.

As shown in FIG. 1, the stator magnetic barrier 115 may be formed at one side of the end of each of the teeth 112 such that the stator magnetic barriers 115 formed in neighboring teeth 112 are positioned to face each other.

The stator magnetic barrier 115 includes a first stator magnetic barrier 115a formed on a side of each of the teeth 112 in the clockwise direction and a second stator magnetic barrier 115b formed on the other side of each of the teeth 112 in the counterclockwise direction.

In addition, each of the teeth 112 included in the motor 100 includes one stator magnetic barrier 115, and neighboring teeth 112 are provided with different stator magnetic barriers 115.

Specifically, when one tooth is provided with the first stator magnetic barrier 115a, two teeth neighboring the tooth are respectively provided with the second stator magnetic barrier 115b. In addition, when one tooth is provided with the second stator magnetic barrier 115b, two teeth neighboring the tooth are respectively provided with the first stator magnetic barrier 115b.

In other words, in the case that each of the teeth includes one stator magnetic barrier 115, the stator magnetic barriers 115 are alternately provided to a side in the counterclockwise direction and a side in the clockwise direction, with respect the center of the teeth. The number of the stator magnetic barriers positioned on the side in the counterclockwise direction with respect to the center of the teeth is equal to the number of the stator magnetic barriers positioned on the side in the clockwise direction.

However, the number, positions, and shape of the stator magnetic barrier are not limited thereto. Each of the teeth may be provided with a plurality of stator magnetic barriers.

In addition, the stator magnetic barrier may have a triangular or circular cross section rather a rectangular cross section and may be positioned at the center of the end of each of the teeth rather on a side of the end of each of the teeth.

The stator magnetic barrier 115 reduces the magnitude of a magnetic field directed from the center of a corresponding one of the teeth 112 to the circumferential direction of the rotor 120. This is because magnetic flux is interrupted by the stator magnetic barrier 115 constructed by a non-magnetic material or air.

The teeth 112 are disposed equally spaced apart from each other along the inner circumferential surface of the stator body 111, and a slot 114 is formed between neighboring teeth 112. A wire is wound around the outer surface of the teeth 112 through the slots 114 formed between neighboring teeth 112, forming the coil 113.

The coil 113 is formed by winding a wire formed of an electrically conductive material around the outer surface of each of the teeth 112. When electrical current flows through the coil 113, a magnetic field is created at the interior of the coil 113, i.e., at the teeth 112 in the radially inward direction of the rotor 120.

FIG. 2 is a cross-sectional view illustrating a motor according to another embodiment of the present disclosure. In the embodiment illustrated in FIG. 2, constituents of the motor 101 identical to those of the motor 100 (see FIG. 1) of the previous embodiment illustrated in FIG. 1 will be assigned the same reference numerals as used in the previous embodiment.

The motor 101 includes a stator 110, a rotor 120 and a shaft R. Configurations of the rotor 120 and the shaft R are the same as those for the motor 100 (see FIG. 1).

The motor 101 differs from the motor 100 in disposition of a stator magnetic barrier 116 formed in the stator 110.

In the case of the motor 100 (see FIG. 1), each of the teeth 112 (see FIG. 1) is provided with one stator magnetic barrier 115 (see FIG. 1). In the case of the motor 101, on the other hand, each of the teeth 112 is provided with a pair of stator magnetic barriers 116.

Specifically, each of the teeth 112 of the motor 101 includes a first stator magnetic barrier 116a provided to one side thereof in the clockwise direction and a second stator magnetic barrier 116b provided to the other side in the counterclockwise direction.

Hereinafter, demagnetization of the permanent magnets of the motor according to one embodiment will be described through comparison with a motor without any stator magnetic barrier.

Figure 3:
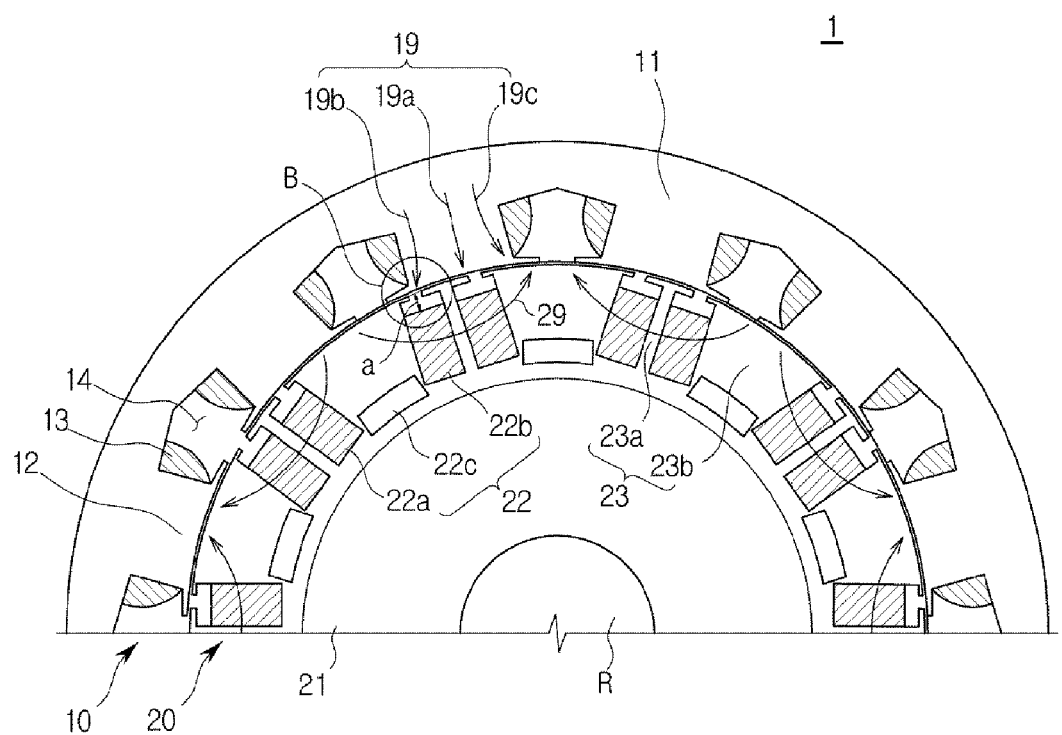
FIG. 3 is a view illustrating a first motor which does not include a stator magnetic barrier.
Figure 4:
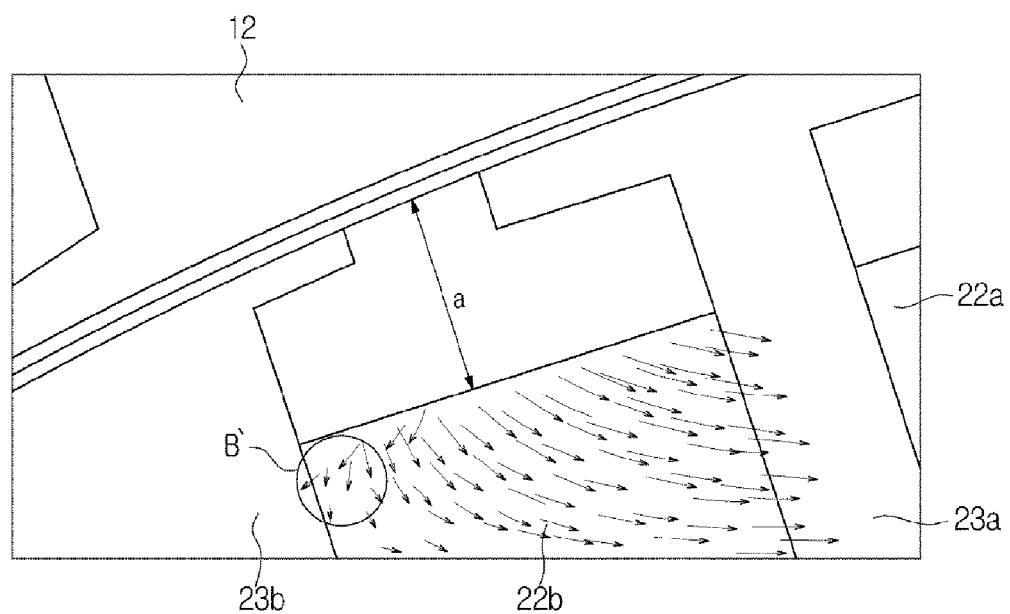
FIG. 4 is a view illustrating a magnetic field of region B of FIG. 3.

FIG. 3 is a view illustrating a first motor which does not include a stator magnetic barrier, and FIG. 4 is a view illustrating a magnetic field of region B of FIG. 3.

A first motor 1 which does not include a stator magnetic barrier includes a stator 10, a rotor 20, and a shaft R as shown in FIG. 3.

The rotor 20 includes a rotor core 21, a pole module 22, and a magnetic member 23. In addition, the pole module 22 includes a first permanent magnet 22a, a second permanent magnet 22b and a rotor magnetic barrier 22c, and a magnetic member 23 includes a first magnetic member 23a and a second magnetic member 23b.

The rotor core 21, the pole module 22 and the magnetic member 23 included in the rotor 20 of the first motor 1 are identical to the rotor core 121 (see FIG. 1), pole module 122 (see FIG. 1) and magnetic member 123 (see FIG. 1) of the motor 100 (see FIG. 1) of the previous embodiment, and therefore a description thereof will be omitted.

The stator 10 includes a stator body 11, teeth 12 and a coil 13, and slots 14 are formed between neighboring teeth 12.

The stator body 11, teeth 12 and coil 13 included in the stator 10 of the first motor 1 are identical to the stator body 111, teeth 112 and coil 113 of the motor 100 (see FIG. 1), and therefore a description thereof will be omitted.

Unlike the motor 100 (see FIG. 1), the teeth 12 of the first motor 1 do not include the stator magnetic barrier 115 (see FIG. 1).

Hereinafter, demagnetization of the permanent magnets 22a and 22b included in the first motor 1 will be described. A magnetic field produced by the coil 13 receiving supplied current does not only include a magnetic field 19a directed in the radially inward direction of radially outward direction of the rotor 20. It also includes magnetic fields 19b and 19c directed in the circumferential direction of the rotor 20.

That is, as shown in FIG. 3, magnetic fields produced by the coil 13 receiving supplied current include a first stator magnetic field 19a created in the radially inward direction of the rotor 20, a second stator magnetic field 19b created counterclockwise along the circumference of the rotor 20, and a third stator magnetic field 19c created clockwise. The second and third stator magnetic fields 19b and 19c directed counterclockwise and clockwise are usually generated on both side of each of the teeth 12.

In addition, as described above, the permanent magnets 22a and 22b of the rotor 20 are magnetized in the circumferential direction of the rotor 20 as shown in FIG. 3.

In this case, the second and third stator magnetic fields 19b and 19c created in the circumferential direction of the rotor 20 may affect the permanent magnets 22a and 22b magnetized in the circumferential direction of the rotor 20.

For example, in the case that the second permanent magnet 22b is magnetized clockwise as shown in FIG. 3, the second stator magnetic field 19b is produced in the opposite direction to magnetization direction of the second permanent magnet 22b. In the case that the strength of the second stator magnetic field 19b is greater than the strength of the rotor magnetic field 29 of the second permanent magnet 22b directed clockwise, the second stator magnetic field 19b and the rotor magnetic field 29 cancels each other, and thus a counterclockwise magnetic field may be formed. In other words, a magnetic field may be applied in the direction opposite to the magnetization direction of the second permanent magnet 22b.

As a result, demagnetization of magnetizing the second permanent magnet 22b in the reverse direction occurs. In other words, the second permanent magnet 22b may be magnetized in the reverse direction, i.e., toward the external magnetic field, or may produce a magnetic field whose strength is less than the strength of the original magnetic field that the second permanent magnet 22b produces.

The demagnetization decreases flux linkage. As a result, torque output by the motor 1 is reduced. In addition, once demagnetization occurs, it persists permanently unless the permanent magnets 22a and 22b are magnetized in the original direction.

In addition, demagnetization occurs mostly at the ends of the permanent magnets 22a and 22b at which the stator 10 adjoins the rotor 20.

Referring to FIG. 4 illustrating region B' of FIG. 3, i.e., the magnetic fields of the permanent magnets 22a and 22b, a counterclockwise magnetic field may be produced in the end region (region B') of the second permanent magnet 22b which is magnetized clockwise.

Specifically, the rotor magnetic field 29 produced by the second permanent magnet 22b is superposed on the second stator magnetic field 19b produced by the coil 13. Thereby, a clockwise magnetic field. i.e., a magnetic field produced in the same direction as the magnetization direction of the second permanent magnet 22b is formed in most of the second permanent magnet 22b.

On the other hand, in the end region of the second permanent magnet 22b, i.e., region B', a counterclockwise magnetic field, i.e., a magnetic field directed in the opposite direction to the magnetization direction of the second permanent magnet 22b is produced. That is, in the region B, the rotor magnetic field 29 produced clockwise by the second permanent magnet 22b is superposed on the second stator magnetic field 19b produced counterclockwise by the coil 13 to create a counterclockwise magnetic field.

By the magnetic field produced in the opposite direction to the magnetization direction at the end of the second permanent magnet 22b, demagnetization occurs at the end of the second permanent magnet 22b.

Demagnetization also occurs at the end of the first permanent magnet 22a in a similar manner.

To prevent demagnetization at the ends of the permanent magnets 22a and 22b, the distance between the ends of the permanent magnets 22a and 22b and the outer circumferential surface of the rotor 20 may be increased.

Figure 5:
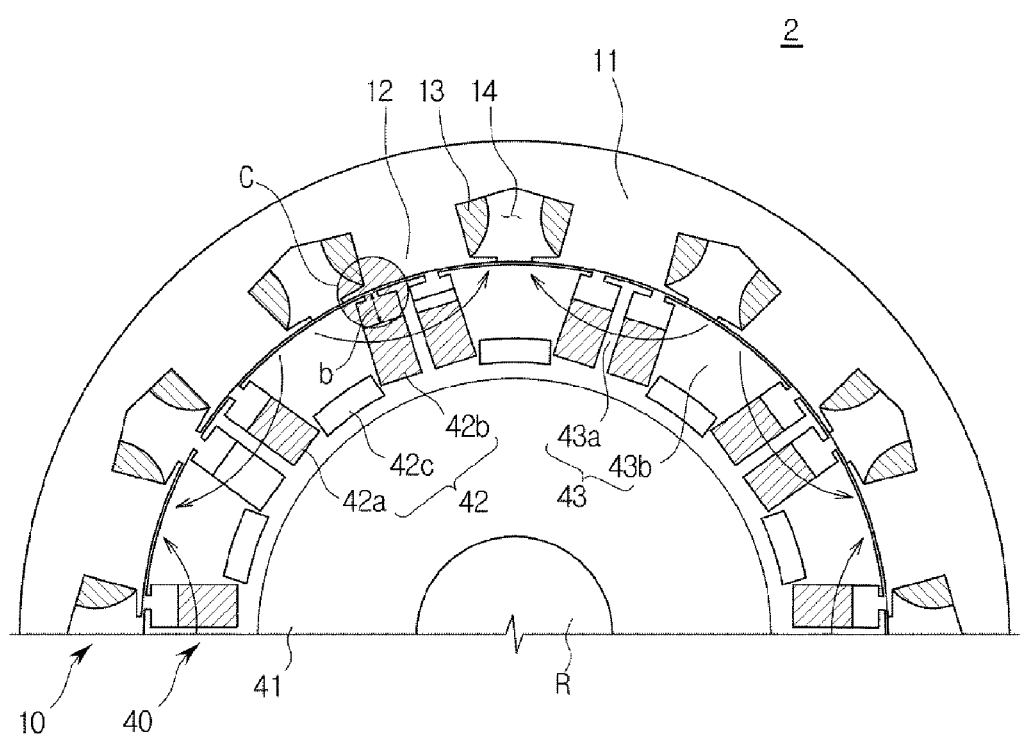
FIG. 5 is a view illustrating a second motor which does not include a stator magnetic barrier.
Figure 6:
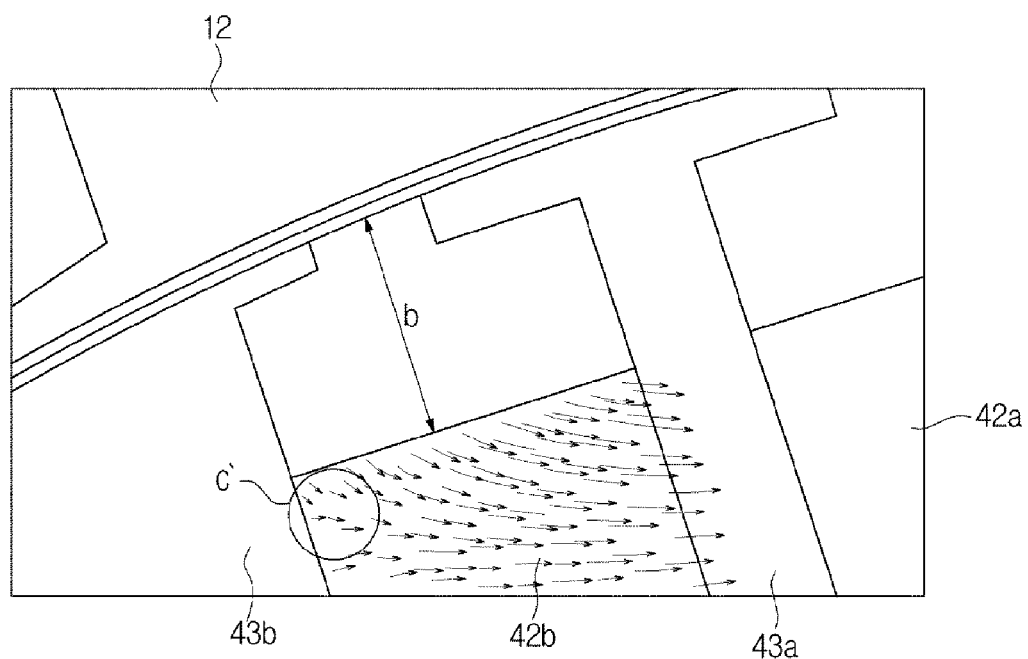
FIG. 6 is a view illustrating a magnetic field of region C of FIG. 5.

FIG. 5 is a view illustrating a second motor which does not include a stator magnetic barrier, and FIG. 6 is a view illustrating a magnetic field of region C of FIG. 5. For constituents identical to those of the first motor 1 shown in FIG. 3, the same reference numerals will be used.

The configuration of a second motor 2 is almost the same as that of the first motor 1 (see FIG. 3). However, permanent magnets 42a and 42b included in the rotor 21 of the second motor 2 are shorter than the permanent magnets 22a and 22b (see FIG. 3) of the first motor 1.

Specifically, in the second motor 2 as shown in FIG. 5, the distance b between the ends of the permanent magnets 42a and 42b and the outer circumferential surface of the rotor 20 may be greater than the corresponding distance a of the first motor 1 (see FIG. 1).

As a result, a clockwise magnetic field, i.e., a magnetic field directed in the same direction as the magnetization direction of the second permanent magnet 22b, which is magnetized clockwise, may be created throughout the interior of the second permanent magnet 22b, as shown in FIG. 6.

In other words, a magnetic field directed in the same direction as the magnetization direction of the second permanent magnet 22b is formed in the end region (region C') of the second permanent magnet 22b, and demagnetization does not occur.

In other words, by increasing the distance between the ends of the permanent magnets 42a and 42b and the outer circumferential surface of the rotor 40, demagnetization of the ends of the permanent magnets 42a and 42b may be prevented.

In the case the distance between the ends of the permanent magnets 42a and 42b and the outer circumferential surface of the rotor 40 is reduced with the sizes of the stator 10 and the rotor 20 kept constant, flux linkage may decrease. In other words, the amount of flux passing through a closed cross section formed by the coil 13 of the stator 10 may be reduced.

In addition, decrease of flux linkage may result in decrease of output of the motor 2, as described above.

The motor 100 according to one embodiment illustrated in FIG. 1 uses the stator magnetic barrier 115 to attenuate only the magnetic field produced in the circumferential direction of the rotor 120, which is the cause of demagnetization with the amount of flux linkage maintained.

Since the stator magnetic barrier 115 is constructed by a non-magnetic material or air, it produces high reluctance, weakening the strength of a magnetic field passing through the stator magnetic barrier 115.

As described above, the circumferential magnetic field of the rotor 120 is produced along the both side of each of the teeth 112, and the stator magnetic barrier 115 is provided to both side of each of the teeth 112. Accordingly, the stator magnetic barrier 115 weakens the circumferential magnetic field of the rotor 120.

As a result, demagnetization of the permanent magnets 122a and 122b included in the rotor 120 may be prevented.

Figure 7:
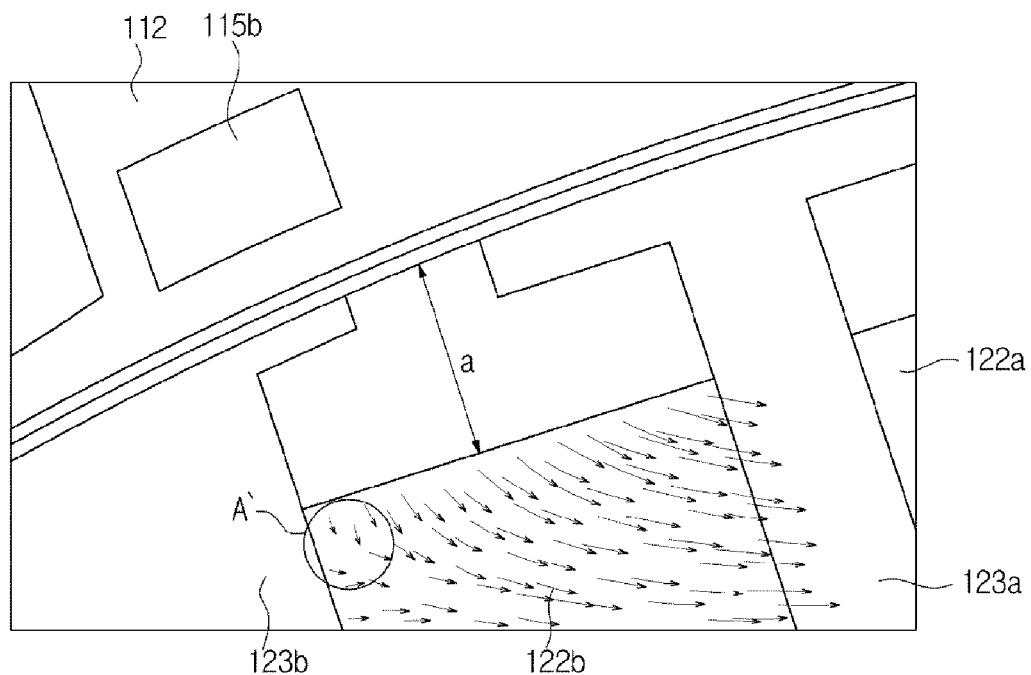
FIG. 7 is a view illustrating a magnetic field of region A of FIG. 1.

Specifically, referring to FIG. 7 showing the magnetic field in region A of FIG. 1, a clockwise magnetic field, i.e., a magnetic field directed in the same direction as the magnetization direction of the second permanent magnet 122b, which is magnetized clockwise, may be created throughout the interior of the second permanent magnet 122b.

This results from weakening of the strength of the magnetic field passing through the stator magnetic barrier 115. In other words, the strength of the magnetic field directed in the circumferential direction of the rotor 120 (counterclockwise in FIG. 7) is weakened.

As the strength of the magnetic field directed in the circumferential direction of the rotor 120 is weakened, a magnetic field directed in the opposite direction to the magnetization direction of the second permanent magnet 122b, i.e., a counterclockwise magnetic field is not produced even when the magnetic field of the stator 110 and the magnetic field of the second permanent magnet 122b are superposed.

Thereby, the permanent magnets 122a and 122b of the rotor 120 are not demagnetized by the stator 110.

Hereinafter, magnetization reversals in a motor according to one embodiment and the first motor will be compared using 4πI-H curves.

Figure 8:
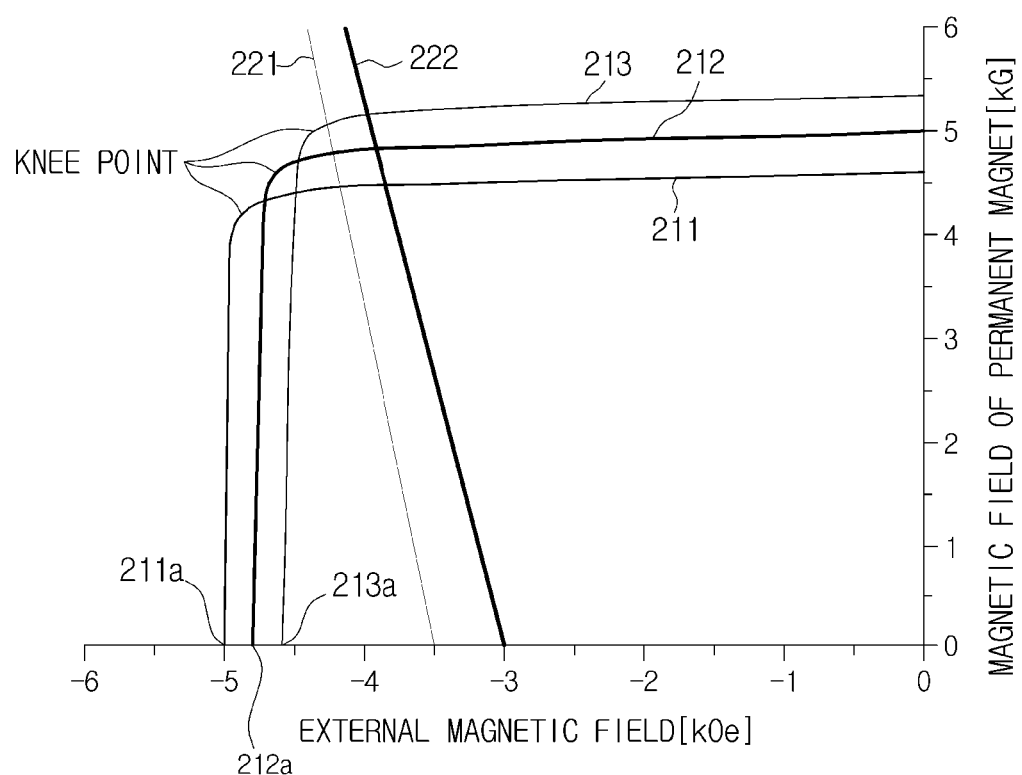
FIG. 8 is a view depicting a demagnetization curve of a permanent magnet included in a motor according to one embodiment and a demagnetization curve of a permanent magnet included in a first motor which does not include the stator magnetic barrier.

FIG. 8 is a view depicting a demagnetization curve of a permanent magnet included in a motor according to one embodiment and a demagnetization curve of a permanent magnet included in a first motor which does not include the stator magnetic barrier.

Specifically, FIG. 8 shows 4πI-H curves 211, 212 and 213 of the permanent magnets 122a and 122b (see FIG. 1) included in the motor 100 (see FIG. 1) and the permanent magnets 22a, 22b (see FIG. 3) included in the first motor 1 (see FIG. 3), a first load profile 221 for the stator 10 (see FIG. 3) of the first motor 1 (see FIG. 3), and a second load profile 222 for the stator 110 (see FIG. 1) of the motor 100 (see FIG. 1).

The 4πI-H curves 211, 212 and 213 include a first 4πI-H curve 211 at a room temperature, a second 4πI-H curve 212 at −20 degrees Celsius, and a third 4πI-H curve 213 at −60 degrees Celsius.

Referring to the 4πI-H curves 211, 212 and 213, when an external magnetic field directed in the opposite direction to the magnetization direction of the permanent magnet increases, the permanent magnet produces a magnetic field having relatively constant strength. However, when the strength of the external magnetic field is greater than or equal to a certain strength, the magnetic field of the permanent magnet drastically decreases and finally the magnetization direction of the permanent magnet is reversed.

The strengths of the external magnetic field at points 211a, 212a and 213a on the x-axis (on which the magnetic field produced by the permanent magnet is '0') that the 4πI-H curves 211, 212 and 213 meet is called intrinsic coercive forces of the permanent magnet.

That is, when an external magnetic field greater than the intrinsic coercive force of the permanent magnet is applied, the magnetization direction of the permanent magnet is reversed.

To prevent the magnetization direction from being reversed, an external magnetic field whose magnitude is less than the values at points (hereinafter, knee points) at which the 4πI-H curves 211, 212 and 213 drastically changes needs to be applied.

In addition, as the external magnetic field decreases below the knees point, probability of occurrence of reversal of magnetization direction decreases.

Again referring to FIG. 8, the first load profile 221 produced by the stator 10 (see FIG. 3) of the first motor 1 (see FIG. 3) is adjacent to the knee points of the 4πI-H curves 211, 212 and 213, while the second load profile 222 produced by the stator 110 (see FIG. 1) of the motor 100 (see FIG. 1) is far apart from the knee points of the 4πI-H curves 211, 212 and 213. In other words, the second load profile 222 is shifted further inward against the knee points than the first load profile 221.

This means that the probability of demagnetization of the permanent magnets 122a and 122b by the magnetic field produced by the stator 110 (see FIG. 1) of the motor 100 (see FIG. 1) is lower than the probability of demagnetization of the permanent magnets 22a and 22b by the magnetic field produced by the stator 10 (see FIG. 3) of the first motor 1 (see FIG. 3).

This suggests that the motor 100 (see FIG. 1) of one embodiment including the stator magnetic barrier is more robust against demagnetization than the first motor 1 (see FIG. 3) which does not include the stator magnetic barrier.

Hereinafter, the output of a motor according to one embodiment of the present disclosure will be compared with the output of the second motor.

Figure 9:
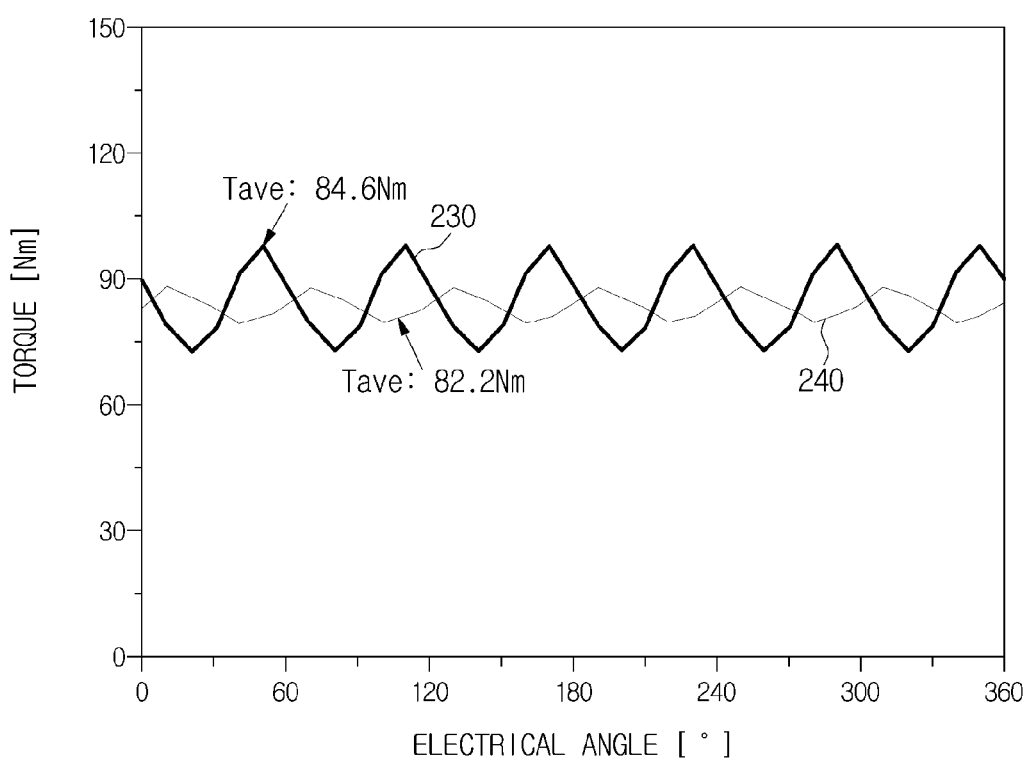
FIG. 9 is a view depicting a torque output by a motor according to one embodiment of the present disclosure and a torque output by a second motor which does not include the stator magnetic barrier.

FIG. 9 is a view depicting a torque output by a motor according to one embodiment of the present disclosure and a torque output by a second motor which does not include the stator magnetic barrier.

The output torque of the motor is shown in Equation 1.

$$T = P_n\{\Psi_a i_q + (L_d - L_q) i_d i_q\}$$

$$= P_n\left\{\Psi_a I_a \cos\beta + \frac{1}{2}(L_q - L_d) I_a^2 \sin 2\beta\right\}$$

$$= T_m + T_r$$

Equation 1

Here, T is a torque, Tm is a magnetic torque, Tr is a reluctance torque, Pn is the number of pole pairs, ψa is flux linkage, id is d-axis current, Ld is d-axis inductance, iq is q-axis current, Lq is q-axis inductance, Ia is driving current, and β is a phase angle of the current.

In Equation 1, the term Pn×ψa×iq on the right side of the equal sign, which may be replaced by Pn×ψa×Ia×cos β, indicates the magnetic torque Tm.

In Equation 1, the term Pn×(Ld−Lq)×id×iq on the right side of the equal sign, which may be replaced by Pn×(Lq−Ld)×Ia²×sin 2β, indicates reluctance torque Tr.

The value of Lq is generally greater than that of Ld. Since the value of Lq is greater than that of Ld, the value of Ld−Lq is negative (−), and the value of Lq−Ld is positive (+). In addition, since the value of id negative (−) and the value of iq is positive (+), the reluctance torque Tr has a positive (+) value.

FIG. 9 shows a first torque curve 230 representing the output torque of the motor 100 (see FIG. 1) calculated based on Equation 1 and a second torque curve 240 representing the output torque of the second motor 2 (see FIG. 5).

According to the first torque curve 230, the average torque output by the motor 100 (see FIG. 1) is 84.4 N·m, and the average torque output by the second motor 2 (see FIG. 5) is 82.2 N·m.

That is, the motor 100 (see FIG. 1) including the stator magnetic barrier 115 (see FIG. 1) may output higher torque than the second motor 2 (see FIG. 5) having the permanent magnets 42a and 42b (see FIG. 5) whose size is reduced to prevent demagnetization.

Accordingly, the motor 100 (see FIG. 1) may have a lower probability of demagnetization than the first motor 1 (see FIG. 3) which does not include the stator magnetic barrier, while maintaining the output torque.

Regarding the shape of the rotor, embodiments of the present disclosure are not limited to the shape of the rotor 120 (see FIG. 1) of the motor 100 (see FIG. 1). Various shapes are applicable to the rotor.

Figure 10:
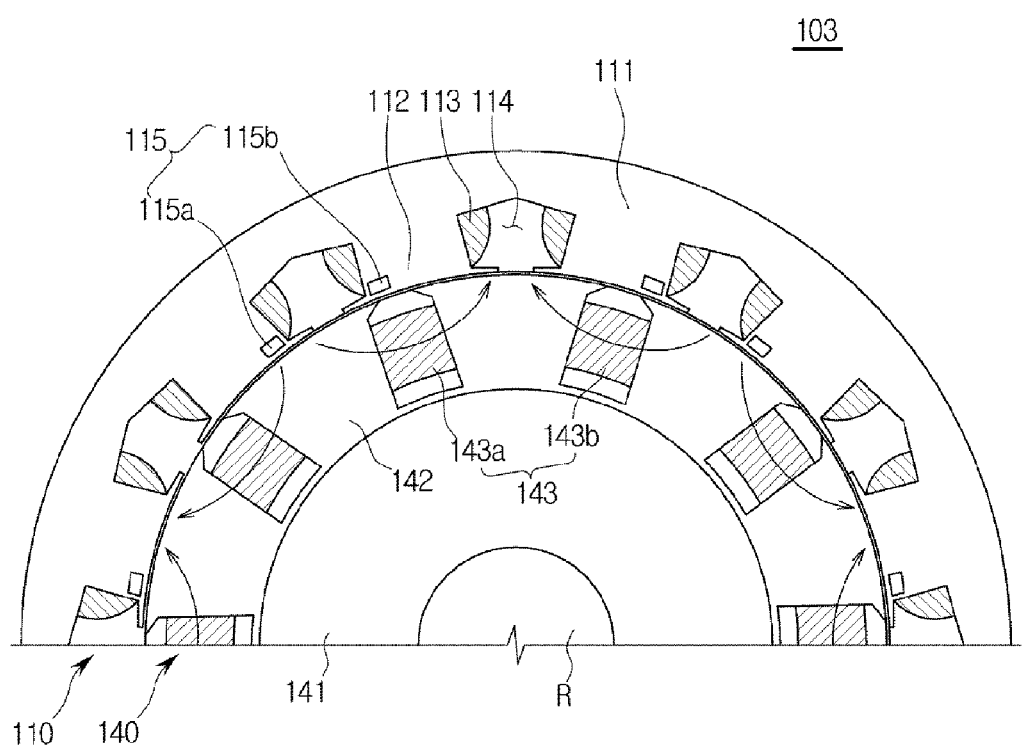
FIGS. 10 and 11 are views illustrating a rotor applicable to a motor according to one embodiment of the present disclosure.
Figure 11:
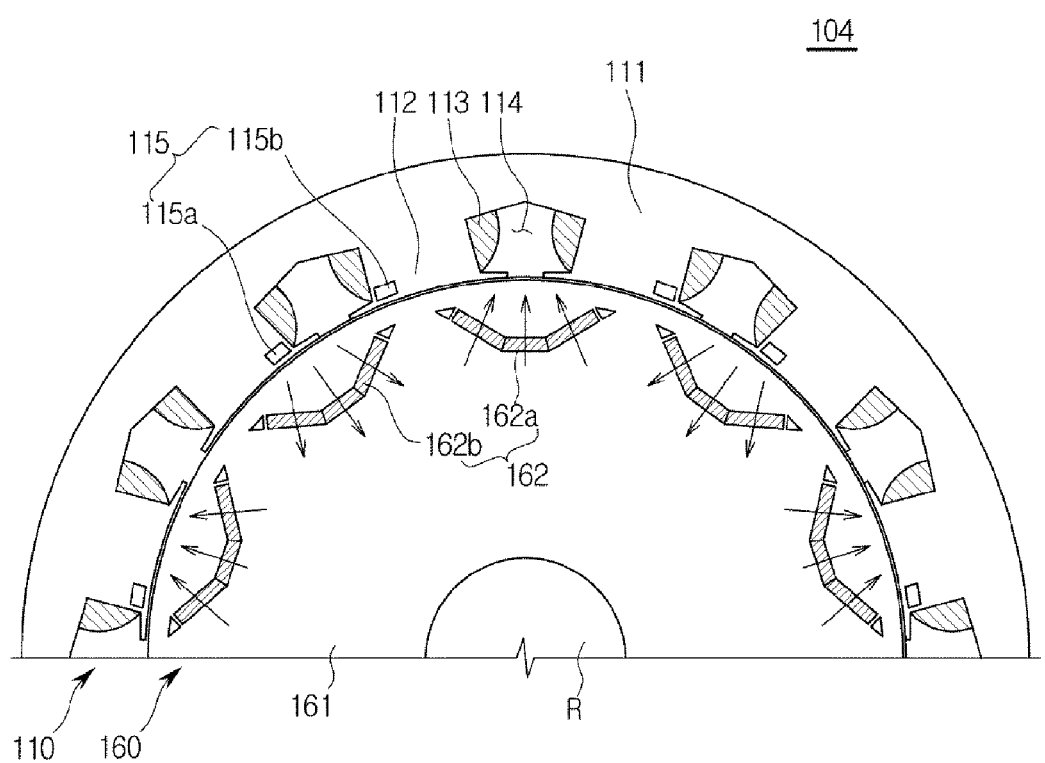

FIGS. 10 and 11 are views illustrating a rotor applicable to a motor according to one embodiment of the present disclosure.

The configuration of the stator 110 of motors 103 and 104 shown in FIGS. 10 and 11 are the same as that of the stator 110 shown in FIG. 1, and therefore a description of the stator 110 will be omitted.

In one embodiment illustrated in FIG. 10, a rotor 140 of the motor 103 includes a rotor core 141, magnetic members 142 and permanent magnets 143.

The magnetic members 142 protrude radially outward from the rotor core 141. The magnetic members 142 are spaced a predetermined distance from each other.

The permanent magnets 143 are disposed between neighboring the magnetic members 142.

The permanent magnets 143 are magnetized in the circumferential direction of the rotor 140. Each of the permanent magnets 143 includes a first permanent magnet 143a, which is magnetized clockwise, and a second permanent magnet 143b, which is magnetized counterclockwise. In addition, the first permanent magnets 143a and the second permanent magnets 143b are alternately arranged along the outer circumferential surface of the rotor 140.

As a result, N pole and S pole are alternately arranged along the rotor 140, and the magnetic field produced by the permanent magnet 143 is concentrated in the radially outward direction of the rotor 140.

In addition, demagnetization of the end of the permanent magnet 143 is prevented by the stator magnetic barrier 115 included in the stator 110.

According to one embodiment illustrated in FIG. 11, a rotor 160 of the motor 104 includes a magnetic member 161 and a permanent magnet group 162.

The permanent magnet group 162 includes a first permanent magnet group 162a, which is provided with a plurality of permanent magnets magnetized in the radially outward direction of the rotor 160, and a second permanent magnet group 162b, which is provided with a plurality of permanent magnets magnetized in the radially inward direction of the rotor 160.

In addition, the first permanent magnet group 162a and the second permanent magnet group 162b are alternately disposed along the outer circumferential surface of the rotor 160.

Thereby, N pole and S pole are repeated along the outer circumferential surface of the rotor 160, and the magnetic field produced by the permanent magnet group 162 is concentrated in the radially outward direction or radially inward direction of the rotor 160.

In addition, the stator magnetic barrier 115 included in the stator 110 prevents demagnetization from occurring at the permanent magnets included in each of the first and second permanent magnet groups 162a and 162b.

As is apparent from the above description, according to an embodiment of the present disclosure, a magnetic field produced in a direction parallel to the outer circumferential surface of the rotor is attenuated, and therefore demagnetization of permanent magnets included in the rotor may be prevented.

Although a few embodiments of the present disclosure have been shown and described, it would be appreciated by those skilled in the art that changes may be made to the embodiments without departing from the principles and spirit of the invention, the scope of which is defined in the claims and their equivalents.

What is claimed is:

1. A motor comprising:
    a stator; and
    a rotor adapted to rotate,
    wherein the stator comprises a stator body, a plurality of teeth protruding from the stator body toward the rotor, and at least one stator magnetic barrier provided to each of the teeth to interrupt magnetic flux,
    wherein the plurality of teeth include a first tooth and a second tooth provided adjacent to the first tooth, and
    a first stator magnetic barrier is formed at one side of the first tooth in a clockwise direction at a portion of the first tooth close to the rotor and a second stator magnetic barrier is formed at one side of the second tooth in a counterclockwise direction at a portion of the second tooth close to the rotor.

2. The motor according to claim 1, wherein the first tooth and the second tooth are alternately disposed along an inner circumferential surface of the stator.

3. The motor according to claim 1, wherein the first and second stator magnetic barriers attenuate a strength of a magnetic field produced in a circumferential direction by the stator.

4. The motor according to claim 3, wherein the first and second stator magnetic barriers are constructed by one of a non-magnetic material and air.

5. The motor according to claim 1, wherein the rotor comprises a plurality of pole modules to produce a magnetic field and a magnetic member to concentrate the magnetic field.

6. The motor according to claim 5, wherein the plurality of pole modules is embedded in the magnetic member.

7. The motor according to claim 6, wherein the plurality of pole modules comprises a pair of permanent magnets magnetized in a circumferential direction of the rotor and a rotor magnetic barrier provided at an inner side of the pair of permanent magnets to connect the permanent magnets to each other.

8. The motor according to claim 7, wherein the permanent magnets are magnetized in different directions.

9. The motor according to claim 1, wherein the rotor comprises a plurality of permanent magnets to produce a magnetic field and a magnetic member to concentrate the magnetic field.

10. The motor according to claim 9, wherein the plurality of permanent magnets is magnetized in a circumferential direction of the rotor.

11. The motor according to claim 10, wherein the plurality of permanent magnets comprises a first permanent magnet magnetized in a clockwise direction of the rotor and a second permanent magnet magnetized in a counterclockwise direction of the rotor.

12. The motor according to claim 11, wherein the first permanent magnet and the second permanent magnet are alternately disposed along a circumference of the rotor.

13. The motor according to claim 1, wherein the rotor comprises a plurality of permanent magnet groups to produce a magnetic field and a magnetic member to concentrate the magnetic field.

14. The motor according to claim 13, wherein the plurality of permanent magnet groups comprises a first permanent magnet group provided with a permanent magnet magnetized in a radially outward direction of the rotor and a second permanent magnet group provided with a permanent magnet magnetized in a radially inward direction of the rotor.

15. The motor according to claim 14, wherein the first permanent magnet group and the second permanent magnet group are alternately disposed along a circumference of the rotor.

16. A motor comprising:
a stator including a stator body, teeth and a coil, where slots are formed between neighboring teeth;
a rotor adapted to rotate through magnetic interaction with the stator, the rotor including a rotor core, a pole module, and a magnetic member;
a shaft connected to the rotor; and
stator magnetic barriers to interrupt magnetic flux produced by the coil, the stator magnetic barriers being provided near end surfaces of the teeth,
wherein each of the teeth comprises only a single stator magnetic barrier, the single stator magnetic barrier being formed alternately on one side of the teeth in a clockwise direction and on an other side of the teeth in a counterclockwise direction for each of the teeth, respectively.

* * * * *